ID>

United States Patent
Wenning

(10) Patent No.: US 12,257,652 B2
(45) Date of Patent: Mar. 25, 2025

(54) METHOD FOR USING SOLUBLE SACRIFICIAL MATERIALS IN ULTRASONIC ADDITIVE MANUFACTURING

(71) Applicant: FABRISONIC LLC, Columbus, OH (US)

(72) Inventor: Justin Wenning, Columbus, OH (US)

( * ) Notice: Subject to any disclaimer, the term of this patent is extended or adjusted under 35 U.S.C. 154(b) by 641 days.

(21) Appl. No.: 17/667,943

(22) Filed: Feb. 9, 2022

(65) Prior Publication Data

US 2022/0168852 A1    Jun. 2, 2022

Related U.S. Application Data

(63) Continuation of application No. 16/369,019, filed on Mar. 29, 2019, now abandoned.

(51) Int. Cl.
| | |
|---|---|
| *B23K 35/36* | (2006.01) |
| *B22F 1/10* | (2022.01) |
| *B22F 3/105* | (2006.01) |
| *B23K 20/10* | (2006.01) |
| *B33Y 10/00* | (2015.01) |
| B33Y 70/00 | (2020.01) |
| C08K 3/16 | (2006.01) |
| C08L 29/04 | (2006.01) |

(52) U.S. Cl.
CPC ............ *B23K 35/3613* (2013.01); *B22F 1/10* (2022.01); *B22F 3/105* (2013.01); *B23K 20/10* (2013.01); *B23K 35/3603* (2013.01); *B33Y 10/00* (2014.12); *B33Y 70/00* (2014.12); *C08K 3/16* (2013.01); *C08L 29/04* (2013.01)

(58) Field of Classification Search
None
See application file for complete search history.

(56) References Cited

U.S. PATENT DOCUMENTS

| | | | | |
|---|---|---|---|---|
| 6,519,500 | B1 * | 2/2003 | White | B33Y 40/20 |
| | | | | 700/182 |
| 8,082,966 | B2 * | 12/2011 | Short | B32B 37/00 |
| | | | | 156/580.2 |
| 9,446,475 | B2 * | 9/2016 | Norfolk | B23K 20/103 |
| 10,443,958 | B2 * | 10/2019 | Andersen | F28F 9/02 |
| 10,682,734 | B2 * | 6/2020 | Andersen | H01L 21/4871 |
| 11,053,154 | B2 * | 7/2021 | Li | C03C 23/0025 |
| 2010/0193998 | A1 * | 8/2010 | Crump | B29C 64/40 |
| | | | | 106/286.6 |
| 2015/0352661 | A1 * | 12/2015 | Karlen | B23K 20/10 |
| | | | | 428/35.8 |
| 2016/0332229 | A1 * | 11/2016 | Snyder | B22F 10/385 |
| 2017/0197365 | A1 * | 7/2017 | Sugiyama | G03G 9/09378 |
| 2017/0251713 | A1 * | 9/2017 | Warner | A23P 30/20 |
| 2018/0111337 | A1 * | 4/2018 | Demuth | B29C 64/40 |
| 2018/0361668 | A1 * | 12/2018 | Kim | B29C 64/336 |
| 2020/0306897 | A1 * | 10/2020 | Wenning | B23K 20/10 |
| 2022/0176449 | A1 * | 6/2022 | Lakshman | B22F 10/20 |
| 2022/0324177 | A1 * | 10/2022 | Debora | B29C 64/255 |

OTHER PUBLICATIONS

Swank, Matthew L. Support Materials for use in Ultrasonic Consolidation, Utah State University, 2009 (Year: 2009).*
Understanding the bonding process of UAM, Dissertation by Qing Mao, Clemson University, 2016 (Year: 2016).*

* cited by examiner

*Primary Examiner* — Devang R Patel

(57) ABSTRACT

A method of ultrasonic additive manufacturing comprising using ultrasonic additive manufacturing to build a solid metal object through ultrasonically welding successive layers of thin metal foil into a three-dimensional shape; machining internal features into the solid metal object, wherein the internal features include voids, chambers, cavities, channels, or conduits; depositing a sacrificial support material in the internal features, wherein the sacrificial support material includes at least one water-soluble solid, and at least one water-soluble binding agent; curing the sacrificial support material at a predetermined temperature for a predetermined period of time within the internal features; using ultrasonic additive manufacturing to deposit additional successive layers of metal on top of the sacrificial material and solid metal object to complete the solid metal object; and introducing a solution containing water into the internal features to dissolve and remove the sacrificial support material therefrom.

15 Claims, No Drawings

METHOD FOR USING SOLUBLE SACRIFICIAL MATERIALS IN ULTRASONIC ADDITIVE MANUFACTURING

CROSS-REFERENCE TO RELATED APPLICATIONS

This patent application is a continuation of U.S. patent application Ser. No. 16/369,019 filed on Mar. 29, 2019 and entitled "Soluble Sacrificial Materials for Use in Ultrasonic Additive Manufacturing", the disclosure of which is hereby incorporated by reference herein in its entirety and made part of the present U.S. utility patent application for all purposes.

BACKGROUND OF THE INVENTION

The described invention relates in general to systems, devices, methods, and materials used in additive manufacturing, and more specifically to methods for using soluble sacrificial materials in ultrasonic additive manufacturing processes.

Ultrasonic additive manufacturing (UAM) is an additive manufacturing technique used to create to create solid objects, parts, or components. UAM involves building up a solid metal object through ultrasonically welding successive layers of thin metal foil (provided as tapes or sheets) into a three-dimensional shape, with periodic machining operations to create the detailed features of the resultant object. High-frequency ultrasonic vibrations are locally applied to the metal foils (to break oxide layers found thereon), which are held together under high pressure, to create a solid-state weld. UAM systems typically include a rolling ultrasonic welding system, consisting of an ultrasonic transducer, a primary booster, a welding sonotrode, and a secondary booster. The vibrations of the transducer are transmitted to the welding sonotrode (i.e., a horn), which is disc-shaped, rolling in the x-direction, and from there to a foil-metal base, which creates an ultrasonic solid-state weld between the thin metal foil and the base material. The continuous rolling and raster pattern of the sonotrode over the foil welds the entire foil to the substrate. By welding a succession of metal foils, first side by side, then one on top of the other (but staggered so that seams do not overlap), a solid metal part can be built. Through the course of the build, there are usually periodic machining operations, using an integrated computer numerically controlled (CNC) system, to add features to the part, to remove excess foil material, and to level the topmost surface of the part. This process is repeated until a solid component has been created or a feature is repaired or added to a component. Thus, the process typically involves subtractive as well as additive steps.

UAM is often used to create components or parts that include internal features such as chambers, cavities, and/or channels through which fluids or gases will flow when the component or part is in use. A portion of the component or part may be created and then the chambers, cavities, and/or channels may be machined into that portion. Applying the additional metal foils necessary to complete the component or part can result in the successively added foil layers bowing or deforming into the chambers, cavities, and/or channels, thereby changing the geometry of these structures and having potentially adverse effects on the mechanical properties thereof and/or the flow of fluids or gases through such openings. To prevent this undesirable outcome, the machined chambers, cavities, and/or channels can be filled with a supportive material prior to the application of additional foil layers. This material is "sacrificial" in the sense that it is removed after the build is complete. Powdered metals and low melting point metals have been used for this purpose, but such materials can be difficult and even dangerous to completely remove from the component or part once the UAM process is complete. Accordingly, there is an ongoing need for a completely soluble sacrificial material that can be easily and entirely removed from a completed component or part.

SUMMARY OF THE INVENTION

The following provides a summary of certain exemplary embodiments of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described system. Rather the use of "a" or "an" should be interpreted to mean "at least one" or "one or more".

In accordance with one aspect of the disclosed technology, a first method of ultrasonic additive manufacturing comprises using ultrasonic additive manufacturing to build a solid metal object through ultrasonically welding successive layers of thin metal foil into a three-dimensional shape; machining internal features into the solid metal object, wherein the internal features include voids, chambers, cavities, channels, or conduits; depositing a sacrificial support material in the internal features, wherein the sacrificial support material includes at least one water-soluble solid, and at least one water-soluble binding agent; curing the sacrificial support material at a predetermined temperature for a predetermined period of time within the internal features; using ultrasonic additive manufacturing to deposit additional successive layers of metal on top of the sacrificial material and solid metal object to complete the solid metal object; and introducing a solution containing water into the internal features to dissolve and remove the sacrificial support material therefrom. The method may further comprise machining channels or other features into the sacrificial support material for facilitating extraction thereof from the completed solid metal object. The sacrificial support material may further comprise a stiffening component, wherein the stiffening component includes at least one powdered metal. The ratio of the at least one water-soluble solid to the at least one water-soluble binding agent may be five parts water-soluble solid to one part water-soluble binding agent, by volume. The water-soluble solid may be a sodium salt; the water-soluble binding agent may be a synthetic polymer; or the water-soluble binding agent may be polyvinyl alcohol. The predetermined temperature may be within the range of 23° C. to 200° C., and the predetermined period of time may be within the range of fifteen minutes to twenty-four hours.

In accordance with another aspect of the disclosed technology, a second method of ultrasonic additive manufacturing comprises using ultrasonic additive manufacturing to build a solid metal object through ultrasonically welding successive layers of thin metal foil into a three-dimensional shape; machining internal features into the solid metal object, wherein the internal features include voids, chambers, cavities, channels, or conduits; depositing a sacrificial support material in the internal features, wherein the sacrificial support material includes at least one water-soluble solid further comprising a salt; and at least one water-soluble binding agent further comprising polyvinyl alcohol; curing the sacrificial support material at a predetermined temperature for a predetermined period of time within the internal features; using ultrasonic additive manufacturing to deposit additional successive layers of metal on top of the sacrificial material and solid metal object to complete the solid metal object; and introducing a solution containing water into the internal features to dissolve and remove the sacrificial support material therefrom. The method may further comprise machining channels or other features into the sacrificial support material for facilitating extraction thereof from the completed solid metal object. The sacrificial support material may further comprise a stiffening component, wherein the stiffening component includes at least one powdered metal. The ratio of the at least one water-soluble solid to the at least one water-soluble binding agent may be five parts water-soluble solid to one part water-soluble binding agent, by volume. The predetermined temperature may be within the range of 23° C. to 200° C., and the predetermined period of time may be within the range of fifteen minutes to twenty-four hours.

In accordance with yet another aspect of the disclosed technology, a third method of ultrasonic additive manufacturing comprises using ultrasonic additive manufacturing to build a solid metal object through ultrasonically welding successive layers of thin metal foil into a three-dimensional shape; machining internal features into the solid metal object, wherein the internal features include voids, chambers, cavities, channels, or conduits; depositing a sacrificial support material in the internal features, wherein the sacrificial support material includes at least one water-soluble solid further comprising a salt; and at least one water-soluble binding agent further comprising polyvinyl alcohol; curing the sacrificial support material at a predetermined temperature for a predetermined period of time within the internal features; machining channels or other features into the sacrificial support material for facilitating extraction thereof from the solid metal object after completion thereof; using ultrasonic additive manufacturing to deposit additional successive layers of metal on top of the sacrificial material and solid metal object to complete the solid metal object; and introducing a solution containing water into the internal features to dissolve and remove the sacrificial support material therefrom. The sacrificial support material may further comprise a stiffening component, wherein the stiffening component includes at least one powdered metal. The ratio of the at least one water-soluble solid to the at least one water-soluble binding agent may be five parts water-soluble solid to one part water-soluble binding agent, by volume. The predetermined temperature may be within the range of 23° C. to 200° C., and the predetermined period of time may be within the range of fifteen minutes to twenty-four hours.

Additional features and aspects of the disclosed technology will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, all descriptions included herein are to be regarded as illustrative and not restrictive in nature.

DETAILED DESCRIPTION OF THE INVENTION

Exemplary embodiments of the disclosed technology are described below. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated herein, the described invention relates in general to systems, devices, methods, and materials used in additive manufacturing and related processes, and more specifically to various soluble supportive sacrificial materials for use in ultrasonic additive manufacturing systems and processes. A supportive sacrificial material used in additive manufacturing processes enables building material on over-hangs (e.g., ledges) or when printing internal features (e.g., channels or conduits) within a part. In such cases, a sacrificial support material acts as an artificial substrate on which material may be printed or deposited. For such applications, an effective sacrificial support material should also be completely removable from a finished component or part so as not to interfere with the proper functioning of the component or part. While the actual sacrificial support material may vary based on the specific application for which it is being used, such material must typically (i) be easy to add to a feature of any size without disrupting printing for any significant period of time; (ii) be able to withstand processing conditions without affect to the additive process; and (iii) be able to be removed from the features associated with its use without affecting any surrounding material. UAM requires a very stiff substrate for printing, accordingly, any sacrificial support material must also be stiff or otherwise very supportive. While prior art approaches have utilized powdered metals or low melting point metals, as discussed above, these materials suffer from significant limitations which are effectively overcome by this invention.

The disclosed technology overcomes the deficiencies of previously known sacrificial materials used for UAM by providing a suitably stiff and stable artificial substrate on which material may be printed or deposited. Exemplary embodiments of this artificial substrate include at least one water-soluble solid and at least one water-soluble binding agent or binder. The at least one water-soluble solid that is partially dissolved in, suspended in, or mixed with the at least one water-soluble binding agent and cured at a predetermined temperature for a predetermined period of time prior to use in ultrasonic additive manufacturing. The at least one solid may be a salt such as a sodium salt (e.g., sodium chloride), a potassium salt, an ammonium salt, or various combinations thereof; and the at least one binding agent may include polyvinyl alcohol (PVA), polyvinyl acetate, or similar materials. A suitable PVA is commercially available from Fibre Glast Developments Corporation (Brookville, Ohio) (see https://s3.amazonaws.com/cdn.fibreglast.com/downloads/PDCT-SDS-00002.pdf). This product is a mixture of ethanol (CAS No. 64-17-5; concentration ≥30-≤35) and n-Butanol (CAS No. 71-36-3; concentration ≥1-≤2). In an exemplary embodiment of this invention, the ratio of salt to PVA is five parts salt to one part PVA by volume, although a wide range of ratios is possible. In most instances, the addition of more PVA results in a mixture having a thinner consistency, thereby requiring additional time for curing.

Both primary components of the disclosed technology (i.e., the solid and the binding agent) are 100% soluble in water and are therefore very easy to remove from various internal geometries, as desired. In certain embodiments, the PVA acts as a binder that holds together a fully soluble powder that does not dissolve or does not dissolve entirely in the PVA. The use of salt, such as sodium chloride provides a suitable level of stiffness (as compared to less suitable materials such as sugars) while still being very easy to dissolve when the sacrificial material is ultimately removed. In addition to salt(s), other embodiments of this invention include one or more additional stiffening components such as, for example, fiber glass, at least one metal powder (e.g., aluminum or tin), sand, or combinations thereof.

An exemplary embodiment of the sacrificial material of the disclosed technology is prepared by mixing salt with PVA to form a mixture. The mixture is then poured or otherwise deposited into a cavity, channel, conduit, or other void that has been formed in a partially completed UAM part or component. The mixture is then cured at a predetermined temperature (e.g., 23° C. to 200° C.) for a predetermined period of time (e.g., fifteen minutes to twenty-four hours). Curing may occur at room temperature or at an elevated temperature by placing the part on a resistive heater, hot plate, or the like. The period of time required for curing is dependent on the size of the cavity and the temperature at which the mixture is heated. After the material has cured, channels or other features may be machined into the sacrificial material for the purpose of facilitating extraction of the material from the completed part or component. UAM is then utilized to complete the part or component and a solution containing water is introduced into the part or component to dissolve the sacrificial material so that it can be flushed out of the part or component or otherwise completely removed such that no residual material remains.

While the disclosed technology has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A method for ultrasonic additive manufacturing, comprising:
   (a) using ultrasonic additive manufacturing to build a solid metal object through ultrasonically welding successive layers of thin metal foil into a three-dimensional shape;
   (b) machining internal features into the solid metal object, wherein the internal features include voids, chambers, cavities, channels, or conduits;
   (c) depositing a sacrificial support material in the internal features, wherein the sacrificial support material includes at least one water-soluble solid, and at least one water-soluble binding agent;
   (d) curing the sacrificial support material at a predetermined temperature for a predetermined period of time within the internal features;
   (e) using ultrasonic additive manufacturing to deposit additional successive layers of metal on top of the sacrificial support material and solid metal object to complete the solid metal object;
   (f) introducing a solution containing water into the internal features to dissolve and remove the sacrificial support material therefrom; and
   (g) machining channels or other features into the sacrificial support material for facilitating extraction thereof from the completed solid metal object.

2. The method of claim 1, wherein the sacrificial support material further comprises a stiffening component, wherein the stiffening component includes at least one powdered metal.

3. The method of claim 1, wherein ratio of the at least one water-soluble solid to the at least one water-soluble binding agent is five parts water-soluble solid to one part water-soluble binding agent, by volume.

4. The method of claim 1, wherein the water-soluble solid is a sodium salt.

5. The method of claim 1, wherein the water-soluble binding agent is a synthetic polymer.

6. The method of claim 1, wherein the water-soluble binding agent is polyvinyl alcohol.

7. The method of claim 1, wherein the predetermined temperature is within the range of 23° C. to 200° C., and wherein the predetermined period of time is within the range of fifteen minutes to twenty-four hours.

8. A method for ultrasonic additive manufacturing, comprising:
   (a) using ultrasonic additive manufacturing to build a solid metal object through ultrasonically welding successive layers of thin metal foil into a three-dimensional shape;
   (b) machining internal features into the solid metal object, wherein the internal features include voids, chambers, cavities, channels, or conduits;
   (c) depositing a sacrificial support material in the internal features,
      (i) wherein the sacrificial support material includes at least one water-soluble solid further comprising a salt; and
      (ii) at least one water-soluble binding agent further comprising polyvinyl alcohol;
   (d) curing the sacrificial support material at a predetermined temperature for a predetermined period of time within the internal features;
   (e) using ultrasonic additive manufacturing to deposit additional successive layers of metal on top of the sacrificial support material and solid metal object to complete the solid metal object;
   (f) introducing a solution containing water into the internal features to dissolve and remove the sacrificial support material therefrom; and
   (g) machining channels or other features into the sacrificial support material for facilitating extraction thereof from the completed solid metal object.

9. The method of claim 8, wherein the sacrificial support material further comprises a stiffening component, wherein the stiffening component includes at least one powdered metal.

10. The method of claim 8, wherein ratio of the at least one water-soluble solid to the at least one water-soluble binding agent is five parts water-soluble solid to one part water-soluble binding agent, by volume.

11. The method of claim 8, wherein the predetermined temperature is within the range of 23° C. to 200° C., and wherein the predetermined period of time is within the range of fifteen minutes to twenty-four hours.

12. A method for ultrasonic additive manufacturing, comprising:

(a) using ultrasonic additive manufacturing to build a solid metal object through ultrasonically welding successive layers of thin metal foil into a three-dimensional shape;
(b) machining internal features into the solid metal object, wherein the internal features include voids, chambers, cavities, channels, or conduits;
(c) depositing a sacrificial support material in the internal features,
   (i) wherein the sacrificial support material includes at least one water-soluble solid further comprising a salt; and
   (ii) at least one water-soluble binding agent further comprising polyvinyl alcohol;
(d) curing the sacrificial support material at a predetermined temperature for a predetermined period of time within the internal features;
(e) machining channels or other features into the sacrificial support material for facilitating extraction thereof from the solid metal object after completion thereof;
(f) using ultrasonic additive manufacturing to deposit additional successive layers of metal on top of the sacrificial support material and solid metal object to complete the solid metal object; and
(g) introducing a solution containing water into the internal features to dissolve and remove the sacrificial support material therefrom.

13. The method of claim 12, wherein the sacrificial support material further comprises a stiffening component, wherein the stiffening component includes at least one powdered metal.

14. The method of claim 12, wherein ratio of the at least one water-soluble solid to the at least one water-soluble binding agent is five parts water-soluble solid to one part water-soluble binding agent, by volume.

15. The method of claim 12, wherein the predetermined temperature is within the range of 23° C. to 200° C., and wherein the predetermined period of time is within the range of fifteen minutes to twenty-four hours.

* * * * *